United States Patent [19]

Kelly et al.

[11] E Re. 29,699

[45] Reissued Jul. 11, 1978

[54] ADHESION OF POLYESTER TO RUBBER USING AN ADHESIVE CONTAINING ADDED METAL COMPOUNDS

[75] Inventors: Robert J. Kelly, Columbia, S.C.; Robert Miller, Woodbridge, Conn.; David Adams, Port Huron, Mich.

[73] Assignee: Uniroyal, Inc., New York, N.Y.

[21] Appl. No.: 830,000

[22] Filed: Sep. 1, 1977

Related U.S. Patent Documents

Reissue of:

[64] Patent No.: 3,903,332
Issued: Sep. 2, 1975
Appl. No.: 332,833
Filed: Feb. 15, 1973

[51] Int. Cl.[2] ..... C09J 7/04

[52] U.S. Cl. ..... 428/414; 428/480; 428/494; 428/524; 428/539

[58] Field of Search ..... 428/414, 480, 494, 524, 428/539

[56] References Cited

U.S. PATENT DOCUMENTS

| | | | |
|---|---|---|---|
| 2,795,515 | 6/1957 | Lavanchy | 117/122 X |
| 3,307,966 | 3/1967 | Shoaf | 117/80 |
| 3,417,069 | 12/1968 | Davis | 117/122 X |
| 3,539,443 | 11/1970 | Jackson | 117/122 |
| 3,578,614 | 5/1971 | Wszolek | 117/122 X |
| 3,579,490 | 5/1971 | Kordinski et al. | 117/122 X |
| 3,628,991 | 12/1971 | Thiele et al. | 117/161 X |
| 3,628,992 | 12/1971 | McKillip | 117/122 X |
| 3,642,937 | 2/1972 | Deckert et al. | 117/122 X |
| 3,729,338 | 4/1973 | Lehmann et al. | 117/122 |
| 3,740,366 | 6/1973 | Sanderson et al. | 117/122 X |
| 3,740,414 | 6/1973 | Olson | 117/122 X |
| 3,753,755 | 8/1973 | Olson | 117/122 X |

*Primary Examiner*—Bernard D. Pianalto
*Attorney, Agent, or Firm*—Thomas A. Beck

[57] ABSTRACT

A shaped polyester article having a rubber latex-polyepoxide-polyisocyanate-phenol-formaldehyde adhesive coating is obtained by the addition of compounds containing at least one of the following metals: sodium, potassium, rubidium, cesium, strontium, silver, cadmium, barium, cerium, uranium, titanium, vanadium, chromium, tin, antimony, manganese, iron, cobalt, nickel, copper, zinc, lead, bismuth, calcium and zirconium to the adhesive prior to the deposit of the adhesive coating on the polyester. The use of said metals in said adhesive composition allows the use of less adhesive to achieve the same degree of adhesion as when an adhesive containing no metal-containing compound is used.

33 Claims, No Drawings

ADHESION OF POLYESTER TO RUBBER USING AN ADHESIVE CONTAINING ADDED METAL COMPOUNDS

Matter enclosed in heavy brackets [ ] appears in the original patent but forms no part of this reissue specification; matter printed in italics indicates the additions made by reissue.

The present invention relates to an improved adhesive system which is used to join shaped polyester articles to articles made from elastomeric compositions.

In the commercial operation of adhering polyester articles to rubber articles two significant factors to be considered are the amount of solids used in the adhesive and the temperature at which the process is run. The amount of solids used in the adhesive is important because the greater the amount of solids in the adhesive required to adhere the polyester to the rubber, the greater is the cost of producing the finished article.

The temperature at which the adhesion process is carried out is important because polyester cord shows a substantially steady decrease in tensile strength as the process temperature increases.

The present invention provides for the manufacture of an article comprising a layer of shaped polyester adhered to a rubber base. Said article can be fabricated containing less solids than is presently required and/or can be fabricated at lower processing temperatures than the temperatures disclosed in U.S. Pat. No. 3,307,966 to Shoaf.

The present invention consists of adding a selected metal-containing compound to an adhesive used to adhere polyester articles such as cord, film, etc., to a natural or synthetic rubber base with the result that the adhesion between said polyester article and said rubber base is substantially increased over the adhesion obtained when the selected metal-containing compound is not added to the adhesive.

Thus, polyester articles such as tire cord can be adhered more firmly to tire carcass rubber, or fabric reinforcement made from polyester cord can be adhered more firmly to rubber in reinforcing such laminated articles as timing belts, conveyor belts, coated fabrics, etc., by use of the adhesive component described herein.

The rubbers which are adhered to the shaped polyester articles using the method of the present invention are the usual conventional sulfur-vulcanizable unsaturated rubbers. These may be defined as diene polymer rubbers, and include not only homopolymers, such as the conjugated diolefin homopolymers, e.g., polybutadiene (whether of high cis-content or otherwise, either solution-prepared or emulsion-prepared) and polyisoprene (whether natural or synthetic), but also copolymers, whether copolymers of high unsaturation (50% or more) as in copolymers of such dienes as butadiene with copolymerizable monoethylenically unsaturated monomers such as styrene (e.g., emulsion-prepared or solution-prepared SBR), acrylonitrile, vinylpyridine, ethyl acrylate, etc., or whether copolymers of low unsaturation as in copolymers of such diolefins as isoprene or butadiene with such isoolefins as isobutylene (e.g., butyl rubber) or the EPDM rubbers which comprise copolymers of at least two different alpha-monoolefins (e.g., ethylene, propylene) with small amounts of copolymerizable polyenes as represented by cyclic or open-chain non-conjugated dienes, e.g., dicyclopentadiene, ethylidene norbornene, methylene norbornene, cyclooctadiene, tetrahydroindene, 1,4-hexadiene, etc.

The natural and synthetic rubbers used in this invention may be compounded with the usual conventional ingredients including sulfur or sulfur-yielding vulcanizing agents, organic or inorganic accelerators of sulfur vulcanization, and if desired, reinforcing fillers or pigments such as carbon black, silica, etc., as well as any such appropriate ingredients as antioxidants, antiozonants, processing aids, extender oils, tackifiers, lubricants, reclaim or other extenders, etc., as appropriate to the particular rubber used and the particular article being manufactured. The composition may contain more than one rubbers, such as a blend of natural rubber and cis-poly(butadiene). Preferred rubbers to be used are natural rubber, poly(butadiene poly(butadiene-co-styrene) or blends thereof. The rubber composition may (especially in the case of pneumatic tire carcass stocks) if desired contain various conventional adhesion-promoting chemicals, such as those described in Belgian Pat. No. 683,718, July 6, 1966 to United States Rubber Company, but the use of such adhesion-promoting chemicals is not essential.

The polyester articles of this invention include condensation polymers of dihydric alcohols with organodibasic acids, particularly dicarboxylic acids, and self-condensation polymers of omega-hydroxy carboxylic acids. It should be understood that the invention is applicable to film and fiber-forming polyesters which have a melting point of 175° C and above in which the ester linkages are intralinear including poly(alkylene arenedioates), poly (cycloalkylenedimethylene arenedioates), and analogous materials. Examples of some of the above-named types of polyesters are, poly(ethylene terephthalate-co-isophthalate), poly(ethylene terephthalate) and poly(1,4-cyclohexylenedimethylene terephthalate).

Physically, the polyester may take the form of filaments, yarns, fabrics, tapes, fibrillated tapes, and films, or other shaped or molded forms presenting a high ratio of surface to volume.

The two dip adhesive system in accordance with the present invention, is described in U.S. Pat. No. 3,307,966 to Shoaf the contents of which are hereby incorporated by reference herein.

In forming the polyester-rubber laminate, the shaped polyester article is preferably contacted with a first dip, (Dip I) as described hereinafter, followed by a second dip (Dip II) as described hereinafter, or the shaped polyester article may be contacted with a single dip comprising the components of Dips I and II. Said article should bear 2 to 30% adhesive after treatment.

The first dip of said system comprises the metal compound as described in admixture with a liquid carrier containing from about 0.05% by weight to about 15.0% by weight of solids of (A) a polyepoxide having an average of at least two epoxy groups in each molecule, a melting point below about 150° C., an average molecular weight below about 3,000 and an epoxide equivalent below about 2,500; and (B) an aromatic polyisocyanate from the class consisting of $Ar(NCO)_n$; and $[Ar(NCO)_n]_m$; $Ar(NHCOX)_n$; wherein Ar is an organic residue containing at least one aromatic nucleus; X represents an aryloxy, arylthio, iminoxy or lactam-N-yl radical, and m and n are whole numbers of at least 2; the weight ratio of (A)/(B) being within the range of from about 0.01 to about 5.0, the said liquid carrier being substantially inert at room temperature to the particular examples of both (A) and (B), used. The liquid carrier may be a solvent for one or both of components (A) and (B); or, either or both of (A) or (B) may be suspended in the carrier as a dispersed or emulsified phase using suitable surfactants if desired. This composition, when applied and processed as described hereinafter provides a final shaped article bearing a coating of the reaction product of (A) and (B) constituting from about 0.2 to about 5% by weight of the coated structure.

Metals which may be used in the compound added to the above-described adhesive are selected from the group consisting of sodium, potassium, rubidium, cesium, strontium, silver, cadmium, barium, cerium, uranium, titanium, vanadium, chromium, tin, antimony, manganese, iron, cobalt, nickel, copper, zinc, lead bismuth, calcium and zirconium.

The amount of metal-containing compound added to form the novel adhesive coating composition of the present invention will vary for each metal-containing compound used but will be within the range of 0.00001 to about 0.010 mole of metal-containing compound per 1000 grams of the [adhesive] *Dip I* composition, however, it is necessary that a sufficient amount of selected metal-containing compound within the range set forth above be added to the adhesive to result in an adhesive bond between rubber and polyester which has at least a 5% improvement in appearance rating (i.e., 2.5% less cord exposed that when the metal is not added to the adhesive) when measured using the hot strip adhesion test described hereinafter in Example 1. It is possible to obtain an appearance rating of 5 on polyester to rubber-bonded articles without the use of the metal compounds of this invention, but this requires a relatively high total amoung of adhesive solids and/or processing temperatures damaging to the strength of the polyester both of which are undesirable and expensive. The surprising and unexpected feature of the present invention is that by the addition of the metal-containing compound in the range disclosed to the adhesive, an appearance rating of 5 can be maintained using the same adhesive composition containing substantially less solids.

The following molal ranges have been determined for the preferred metal containing compounds listed: cadmium—0.00010 to 0.00400; copper—0.00002 to 0.00189; zinc—0.00002 to 0.00185; silver—0.00046 to 0.00400; manganese—0.00005 to 0.002. All values noted above are expressed in mole/1000g. solution.

Suitable metal-containing compounds used in the adhesive include compounds such as zinc acetate, zinc acetylacetonate, zinc stearate, zinc oxide, zinc chloride, zinc acetate, zinc sulfate, zinc carbonate, ferric acetate, ferric acetylacetonate, lead acetate, bis(tributyltin) oxide, tetra-isopropyl orthotitanate, cadmium nitrate, cadmium acetylacetonate, cadmium chloride, cadmium stearate, cadmium acetate, cadmium sulfate, cadmium carbonate, cobalt nitrate, uranyl nitrate, manganous nitrate, manganic nitrate, cobalt-2-ethylhexoate, stannous oxide, dibutyltin maleate, sodium-o-phenylphenate, stannous oleate, zirconium acetylacetonate, cupric nitrate, and cupric acetylacetonate. Especially preferred metal-containing compounds are the zinc, copper, and cadmium compounds.

The novel [adhesive] composition of Dip I is applied to the polyester shaped article by any conventonal means such as dipping, spraying, brushing, padding or the like with the article relaxed or under tension. The reaction of (A) with (B) occurs upon drying when (B) is an isocyanate per se. When (B) is the dimer or the adduct of the isocyanate the wetted shaped article is heated at a temperature of from about 150° C. to about 235° C. for a period of from about 15 seconds to about 15 minutes to remove the liquid carrier and to cure the coating. Particularly, where the shaped article is fibrous in nature, it is preferred that the article be subjected to at least sufficient tension to prevent extensive shrinkage during the wetting and subsequent curing operations.

Alternatively the reactants (A) and (B) of Dip I can be applied separately in either order from the same or different liquid carriers to said shaped article, instead of applying them simultaneously from the same carrier as described above. It is required that the metal-containing compound and reactants (A) and (B) be applied to the polyester article prior to the curing step described above.

The components of Dip II, if a two step dip process is used are a phenol-formaldehyde solution in combination with a rubber latex wherein the rubber is selected from the group consisting of natural rubber, SBR and butadiene-vinyl pyridine-styrene rubber. A preferred phenol-formaldehyde-rubber-latex is an aqueous resorcinol-formaldehyde solution and butadiene vinyl pyridine latex (referred to hereinafter as RFL) as taught in U.S. Pat. No. 2,990,313 to Knowles et al. Mixtures of said latices can also be used.

In the preferred embodiment of the invention using a two dip system Dip I contans a polyisocyanate or source, an polyepoxide, a surfactant, the metal-containing compound and water.

After the polyester article has been contacted with the Dip I, the coated article is heated to a temperature between 340° and 475° F. for between 20 and 200 seconds, preferably between 400° and 450° F. for 30 to 60 seconds. The polyester may be held under tension during this heating portion of the cycle to prevent extensive shrinkage.

The coated polyester article is then contacted with Dip II which preferably contains a rubber latex such as a butadiene-vinylpyridine-styrene terpolymer, a resorcinol-formaldehyde resin, ammonium hydroxide, (although other bases such as sodium hydroxide, potassium hydroxide, etc., can be used), and formalin (a formaldehyde-water mixture).

The polyester so treated with the Dip II is then heated to a temperature between 350° and 450° F. for a period of from 60 to 200 seconds, preferably at between about 390° and 420° F for 80 to 100 seconds.

Certain additional additives can be put in either the first or second dip or both as desired without departing from the scope of the invention.

It is noted however, that the metal-containing compound must be put in the Dip I when the two dip system is used. If the metal-containing compound is put in the Dip II there is no appeciable increase in adhesion.

It is possible to increase adhesion using a single dip system, however, this is not the preferred method. As noted, if a single dip system is used, all of the above-noted constituents of the first and second dips are combined in a single container and the shaped article is run through the adhesive to pick up at least 4.0% adhesive (dry weight based upon the weight of the article). The article is then heated to between about 350° and 450° F. (preferably 390° to 420° F.) for about 80 to 100 seconds under tension.

Specific examples of the two dip and one dip method are given in the following examples by way of illustration.

EXAMPLE 1

This example illustrates the application of the novel adhesive of the present invention to bond polyester tire cord to rubber using a two dip system.

Twisted 3440 denier, polyester (polyethylene terephthalate) tire cord consisting of 3 ply cord (in which each ply has 9.2 'Z' turns in the singles and 9.2 'S' turns in the plying operation) is run through a first dip having the following composition.

COMPOSITION - DIP I 1. 22.0 g. Phenol blocked MDI (Hylene MP-du Pont).
2. 1.5 g. Aerosol O.T. (dioctyl sodium sulfosuccinate).
3. 9.00 g. Epon 812 (An epoxide).
4. 1200 g. $H_2O$.
5. Metal-containing compound (expressed in moles/1000 g. of solution) see Table 1 below.

The total solids on the cord after this first dip treatment is 0.5% – 1.5% (dry weight based upon the weight of the cord).

The cord is then cured for 40 seconds at 445° F. while applying 2.0% stretch. The cord is then run through a second dip (RFL dip) having the following composition:

| COMPOSITION - DIP II | | |
|---|---|---|
| 1. | Vinylpyridine latex (40% solids consisting of 70% butadiene-15% vinylpyridine-15% styrene terpolymer (Pyratex) | 100 g. |
| 2. | Ammonium hydroxide | 2.5 g. |
| 3. | Resorcinol-formaldehyde condensation product (Koppers "Penacolite 2170") | 9.0 g. |
| 4. | Formalin (37%) | 4.5 g. |

This composition is diluted with $H_2O$ to 20% solids.

The cord is then dried and cured at 390° F. for 90 seconds. The percent solids of RFL picked up on cord is 2.5 to 4.5% dry weight based upon the weight of the cord. Adhesion results are obtained using the following test method which is also described in U.S. Pat. No. 3,549,481 the contents of which are hereby incorporated by reference herein.

Treated polyester cords are placed in parallel arrangement with 24 ends to the inch. Two pieces of 3 inch × 4 inch backing stock (a rubber material having a light weight reinforcing fabric in it) are pressed onto the cords by hand with the cord runnning parallel to the 3 inch side. The two pieces of backing stock are placed so that they cover different portions of the cords and are approximately 1 inch apart. The cord is then trimmed even around the edges of the backing stock. The cord side of the backing stock is then pressed by hand onto an adhesion stock consisting of a 35/45/20 belend of natural rubber, styrene-butadiene rubber and cis-butadiene rubber tire skim stock. The rubber blend also contained 50 parts of carbon black, 1.5 parts of stearic acid, 25 parts of reclaimed rubber, 10 parts of zinc oxide, 1 part of antioxidant, 5 parts of pine tar, 1 part of mercaptobenzothiazole, 0.1 parts of diphenylguanidine and 3.2 parts of sulfur. Care is taken not to touch the cord or the adhesion surface of the backing stock or the adhesion stock. The articles formed are trimmed and cut in half. A 1 inch × 4 inch aluminum foil or Holland Cloth separator is placed on the exposed surface of the adhesion stock on one of the specimen halves, with the separator being aligned along one 4 inch edge. The specimen halves are laminated together so that adhesion stock contacts adhesion stock except in the area where the separator is present.

The assembly is placed in a press and cured for 6 minutes at 350° F platen temperature and 200 psi pressure.

The resultant article is cut into four 1 inch × 3 inch strips and the two end strips are discarded.

The separator is removed from the end of the remaining middle strip, the two end portions (referred to as tabs) are spread apart and maintained in that condition and the strips are placed in an Instron oven at 250° F for 30 minutes. Subsequently the tabs of each article are placed in the jaws of an Instron Tester, and the jaws of the tester are separated at a rate of 5 inch per minute and a chart speed of 0.5 inch per minute. Sufficient force in the tester is obtained to separate the article along its length. The separated surfaces are then examined to see how much of the cord has become visible due to stripping of the rubber from the cord. This is recorded according to the following scale:

| Rating | | Appearance |
|---|---|---|
| 5 | 100% Rubber Failure | No Cord Visible |
| 4 | 75% Rubber Failure | 25% Cord Visible |
| 3 | 50% Rubber Failure | 50% Cord Visible |
| 2 | 25% Rubber Failure | 75% Cord Visible |
| 1 | No Rubber Failure | 100% Cord Visible |

Thus, the highest value on the scale indicates that the adhesion bond was so strong that the failure occurred in the rubber stock; the lowest value on the scale indicates a weak adhesive bond, failure having occurred at the interface of the rubber stock and the cord rather than in the rubber stock itself.

Table I identifies the metal compound added to the first dip described above in moles per 1000 grams of [adhesive] *Dip I* composition. The appearance rating as determined above is listed as follows:

TABLE I

| Sample No. | Concentration-Metal-Containing Compound | Appearance Control | Appearance Sample |
|---|---|---|---|
| 1. | 0.00029 Tetra isopropyl orthotitanate | 3.5 | 4.5 |
| 2. | 0.00071 Vanadium Trisacetylacetopate | 3.5 | 4.9 |
| 3. | 0.00071 Chromium Acetylacetonate | 3.5 | 4.0 |
| 4. | 0.00051 Bismuth Nitrate | 3.5 | 5.0 |
| 5. | 0.00097 Nickel bis-acetylacetonate | 3.5 | 5.0 |
| 6. | 0.00297 Potassium Chloride | 2.8 | 4.3 |
| 7. | 0.00032 Cadmium nitrate | 2.5 | 4.7 |
| 8. | 0.00043 Cobalt-2-Ethylhexoate | 2.5 | 4.9 |
| 9. | 0.00084 Stannous oxide | 2.5 | 4.5 |
| 10. | 0.00029 Dibutyl tin maleate | 2.5 | 4.7 |
| 11. | 0.00038 Sodium-o-phenylphenate | 2.5 | 4.8 |
| 12. | 0.00015 Stannous oleate | 2.5 | 4.0 |
| 13. | 0.00023 Zinc acetate | 2.5 | 4.5 |

TABLE I-continued

| Sample No. | Concentration-Metal-Containing Compound | Appearance Control | Appearance Sample |
|---|---|---|---|
| 14. | 0.00046 Zinc acetate | 2.5 | 4.8 |
| 15. | 0.00091 Zinc acetate | 2.5 | 5.0 |
| 16. | 0.03640 Zinc acetate | 2.5 | 2.5 |
| 17. | 0.00016 Zinc stearate | 2.5 | 4.4 |
| 18. | 0.00088 Zinc acetylacetonate | 2.5 | 4.6 |
| 19. | 0.00014 Zinc acetylacetonate | 2.5 | 5.0 |
| 20. | 0.00034 Zinc nitrate | 2.5 | 4.7 |
| 21. | 0.00020 Uranyl nitrate | 2.5 | 4.0 |
| 22. | 0.00035 Manganous nitrate | 2.5 | 4.4 |
| 23. | 0.00025 Zirconium acetylacetonate | 2.5 | 4.3 |
| 24. | 0.00017 Bis (tributyl tin oxide | 2.5 | 4.5 |
| 25. | 0.00026 Lead acetate | 2.5 | 4.2 |
| 26. | 0.00052 Ferric acetate | 2.5 | 3.8 |
| 27. | 0.00038 Cupric acetylacetonate | 2.5 | 3.8 |
| 28. | 0.00034 Cobalt nitrate | 2.5 | 4.0 |
| 29. | 0.00135 Calcium hydroxide | 2.5 | 3.5 |
| 30. | 0.00028 Ferric acetylacetonate | 2.5 | 3.6 |
| 31. | 0.00246 Zinc oxide | 2.5 | 4.6 |
| 32. | 0.00040 Antimony (ous) trifluoride | 2.5 | 4.5 |
| 33. | 0.00114 Rubidium Nitrate | 2.0 | 2.5 |
| 34. | 0.00092 Silver Nitrate | 1.8 | 4.3 |
| 35. | 0.00121 Strontium Acetate | 1.5 | 2.0 |
| 36. | 0.00113 Cesium Nitrate | 1.2 | 2.0 |
| 37. | 0.00114 Barium Acetate | 1.2 | 4.0 |
| 38. | 0.00113 Ceric Nitrate | 1.2 | 4.1 |

Sample numbers 13 to 16 illustrate the unexpected results obtained by the addition of the metal containing compound to the adhesive in accordance with the present invention. More specifically, sample numbers 13–15 demonstrate that if zinc acetate is added to the adhesive within the prescribed range, (i.e., 0.00001 to 0.010 mole metal compound per 1000g coating composition) a substantial increase in adhesion is obtained as is evidenced by comparing the appearance values obtained using the hot strip adhesion test on the control and sample. The appearance values on line 16 on the other hand demonstrate that there is no increase in adhesion when zinc acetate is added to the adhesive in an amount in excess of the prescribed range.

EXAMPLE 2

This example illustrates the application of the novel adhesive of the present invention to bond polyester tire cord to rubber using a single dip system.

A twisted 3 ply, 3440 denier, polyester tire cord as described in Example 1 is run through composition A, and an identical cord is run through composition B as set forth in Table II.

TABLE II

| | A | B |
|---|---|---|
| Vinyl pyridine latex (Pyratex) | 100g | 100g |
| Ammonium hydroxide | 2.5g | 2.5g |
| Resorcinol-Formaldehyde Condensation Product (Koppers "Penacolite 2170") | 9.0g | 9.0g |
| Formalin (37%) | 4.5g | 4.5g |
| Hylene MP(Phenol blocked MDI) | 3.6g | 3.6g |
| Epon 812 (Epoxide) | 1.5g | 1.5g |
| Aerosol OT | 0.24g | 0.24g |
| Water | 120.0g | 120.0g |
| Zinc acetate | — | .0489 |

Total solids on cord is 4.5 – 5%. The cord is then cured for 90 seconds at 390° F. Pads were made using the backing stock and adhesive stock compositions and method described in Example 1. The appearance ratings are listed in Table III.

TABLE III

| Appearance Rating A | Appearance Rating B |
|---|---|
| 3.0 | 3.5 |

EXAMPLE 3

Samples of the twisted 3 ply, 3440 denier, polyester tire cord described in Example 1 are run through one of the following first dips, which have the composition set forth in Table IV.

TABLE IV

| | A | B | C | D |
|---|---|---|---|---|
| Hylene MP | 22.0g | 22.0g | 22.0g | 22.0g |
| Aerosol OT | 1.5g | 1.5g | 1.5g | 1.5g |
| Epon 812 | 9.0g | 9.0g | 9.0g | 9.0g |
| Water | 640g | 640g | 640g | 640g |
| $Zn(OAc)_2$ (mole/1000 grams of dip) | — | 0.00009 | 0.00450 | — |
| $Zn(Stearate)_2$ | — | — | — | 0.00031 |

First dip solids picked up on the cord is 1.50 to 1.75%. The cord is cured for 40 seconds at 410 F. while applying 2.0% stretch. The cord samples are run through the second dip composition described in Example 1, and dried and cured at 390° F for 90 seconds. RFL solids picked up on the cord is between 4.0 and 4.25%. Cured test pads are made using the backing stock and adhesive stock compositions and method described in Example 1. The pads are tested for appearance according to the method described in Example 1 and the appearance results are set forth in Table V.

TABLE V

| A | B | C | D |
|---|---|---|---|
| 2.0 | 4.6 | 5.0 | 5.0 |

EXAMPLE 4

This example illustrates the application of the novel adhesive of the present invention containing a diisocyanate dimer to bond polyester tire cord to rubber using a two dip system.

Twisted 3440 denier, polyester (polyethylene terephthalate) tire cord consisting of 3 ply cord (in which each ply has 9.2 'Z' turns in the singles and 9.2 'S' turns in the plying operation) is run through a first dip having the following composition.

COMPOSITION - DIP I 1. 4.20 g. TDI Dimer (Desmodur TT - Bayer).
2. 0.24 g. Aerosol O.T. (Dioctyl sodium sulfosuccinate).
3. 1.60 g. Epon 812 (An Epoxide)
4. 594.70 g. $H_2O$
5. 0.00113 mole/1000 gm of Solution of Zinc Acetate.

The cord was cured for 43 seconds at 435° F. while applying 0.5% stretch. It was then pressed through Dip II as set forth in Example I following which it was dried and cured at 420° F. for 96 seconds at −1.25% relaxation. It was tested using the hot strip adhesion test set forth in Example I.

The appearance rating was 4.3. The control without metal catalyst was 1.5.

We claim:

1. In a shaped polyester article bearing from 2 to about 30% by weight of an adhesive coating composition comprising the reaction products of:

*a first component (I) comprising*

I. A. a polyepoxide having an average of at least two epoxy groups in each molecule, a melting point below about 150° C., an average molecular weight below about 3,000 and an epoxide equivalent below about 2,500 and B. an aromatic polyisocyanate from the class consisting of $Ar(NCO)_n$ $[Ar(NCO)_n]_m$, and $Ar(NHCOX)_n$; wherein Ar is an organic residue containing at least one aromatic nucleus, X is a radical, selected from the group consisting of aryloxy, arylthio, iminoxy and lactam-N-yl, and m and n are whole numbers of at least 2; the weight ratio of (A)/(B) being within the range of from about 0.01 to about 5.0 and the % by weight being 0.2 to 5.0; in combination, with II. [the residue amounting to] *a second component (II), of from about* 1.8 to 25% by weight of a [rubber latex containing the reaction product of a phenol] *mixture of the dried reaction products of a phenolicformaldehyde resin, a rubber latex* and formaldehyde, said rubber latex being selected from the group consisting of natural rubber, SBR and butadiene-vinylpyridine-styrene rubber;

the improvement comprising having added to said [coating composition] *first component I while in admixture with a liquid carrier and* prior to deposit on said polyester article, *a* sufficient amount of a metal-containing compound in the range between 0.00001 and 0.010 moles per 1,000 grams of said [coating composition] *first component I in its liquid carrier* to result in an adhesive bond which has at least a 5% improvement in appearance rating using the hot strip adhesion test, said improvement being compared with a rubber-polyester article control that contains no metal containing compound in said adhesive coating composition, said metal being selected from the group consisting of sodium, potassium rubidium, cesium, strontium, silver, cadmium, barium, cerium, uranium, titanium, vanadium, chromium, tin, antimony, maganese, iron, cobalt, nickel, copper, zinc, lead, bismuth, calcium and zirconium whereby less adhesive is required to achieve the same degree of adhesion as when an adhesive containing no metal-containing compound is used.

2. The adhesive coating composition of claim 1 wherein A is a polyepoxide formed by the reaction of epichlorhydrin with glycerol.

3. The adhesive coating composition of claim 1 wherein B is phenol blocked meta phenylene diisocyanate.

4. The adhesive coating composition of claim 1, wherein B is phenol blocked p,p'-diphenylmethane diisocyanate.

5. The adhesion coating of claim 1 wherein B is the dimer of p,p'-diphenylmethane diisocyanate.

6. The adhesion coating of claim 1 wherein B the dimer of toluene diisocyanate.

7. The adhesive coating composition of claim 1 which contains 0.00010 to 0.0040 mole of a cadmium compound per 1000 grams of [adhesive coating composition] *component I in said liquid carrier.*

8. The adhesive coating composition of claim 1 which contains 0.00002 to 0.00189 mole of a copper compound per 1000 grams of [adhesive coating composition] *Component I in said liquid carrier.*

9. The adhesive coating composition of claim 1 which contains 0.00046 to 0.004 mole of a silver compound per 1000 grams of [adhesive coating composition] *Component I in said liquid carrier.*

10. The adhesive coating composition of claim 1 which contains 0.00002 to 0.00185 mole of zinc compound per 1000 grams of [adhesive coating composition] *Component I in said liquid carrier.*

11. The adhesive coating composition of claim 1 which contains 0.00005 to 0.002 mole of a manganese compound per 1000 grams of [adhesive coating composition] *component I in said liquid carrier.*

12. The adhesive coating composition of claim 7 wherein the cadmium compound is cadmium nitrate.

13. The adhesive coating composition of claim 7 wherein the cadmium compound is cadmium acetylacetonate.

14. The adhesive coating composition of claim 7 wherein the cadmium compound is cadmium chloride.

15. The adhesive coating composition of claim 7 wherein the cadmium compound is cadmium stearate.

16. The adhesive coating composition of claim 7 wherein the cadmium compound is cadmium acetate.

17. The adhesive coating composition of claim 7 wherein the cadmium compound is cadmium sulfate.

18. The adhesive coating composition of claim 7 wherein the cadmium compound is cadmium carbonate.

19. The adhesive coating composition of claim 8 wherein the copper compound is cupric nitrate.

20. The adhesive coating composition of claim 8 wherein the copper compound is cupric acetylacetonate.

21. The adhesive coating composition of claim 10 wherein the zinc compound is zinc acetate.

22. The adhesive coating composition of claim 10 wherein the zinc compound is zinc acetylacetonate.

23. The adhesive coating composition of claim 10 wherein the zinc compound is zinc stearate.

24. The adhesive coating composition of claim 10 wherein the zinc compound is zinc oxide.

25. The adhesive coating composition of claim 10 wherein the zinc compound is zinc chloride.

26. The adhesive coating composition of claim 10 wherein the zinc compound is zinc sulfate.

27. The adhesive coating composition of claim 10 wherein the zinc compound is zinc carbonate.

28. A shaped article of manufacture comprising a natural or synthetic elastomer which is reinforced in its interior with at least one layer of said shaped polyester article defined in claim 1.

29. The shaped article of manufacture defined in claim 28 wherein said shaped polyester article is a fabric.

30. The shaped article of manufacture defined in claim 29 wherein said elastomer is natural rubber.

31. The shaped article of manufacture defined in claim 29 wherein said elastomer is synthetic and is selected from the group consisting of conjugated diolefin homopolymers, copolymers of conjugated dienes with monoethylenically unsaturated monomers or EPDM rubbers.

32. The article of manufacture defined in claim 31 wherein the polyester in said fabric has a melting point of 175° C. and above and has ester linkages which are intralinear.

*33. The adhesive coating composition of claim 1 wherein said phenolicformaldehyde resin in second component II is resorcinol-formaldehyde resin.*

* * * * *